(12) United States Patent
Chang et al.

(10) Patent No.: US 6,463,270 B1
(45) Date of Patent: Oct. 8, 2002

(54) METHOD AND APPARATUS SUPPORTING NON-GEOGRAPHIC TELEPHONE NUMBERS

(75) Inventors: Li-Fung Chang, Holmdel; Ravi Kumar Jain, Hoboken; Subhashini Rajagopalan, Somerset, all of NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 1129 days.

(21) Appl. No.: 08/592,212

(22) Filed: Jan. 26, 1996

(51) Int. Cl.⁷ .............................................. H04Q 7/20
(52) U.S. Cl. ................................................... 455/403
(58) Field of Search ......................... 455/403; 379/201, 379/207

(56) References Cited

U.S. PATENT DOCUMENTS

| | | | |
|---|---|---|---|
| 5,210,787 A | 5/1993 | Hayes et al. | 379/60 |
| 5,457,736 A | 10/1995 | Cain et al. | 379/60 |
| 5,490,203 A | 2/1996 | Jain et al. | 379/59 |
| 5,533,107 A * | 7/1996 | Irwin et al. | 379/201 |
| 5,764,745 A * | 6/1998 | Chan et al. | 379/207 |

FOREIGN PATENT DOCUMENTS

| | | | |
|---|---|---|---|
| EP | 0 584 954 A1 | 7/1993 | |
| EP | 0 663 784 A2 | 6/1994 | H04Q/7/24 |

OTHER PUBLICATIONS

Victor O. K. Li and Xiaoxin Qui, "Personal Communication Systems (PCS)," Proceedings of the IEEE, vol. 83, No. 9, New York, Sep. 1995, pp. 1210–1243.

D. Knuth, The Art of Computer Programming, vol. 3, Sorting and Searching, Chapter 6, section 6.4, Addison–Wesley, 1973.

* cited by examiner

Primary Examiner—William Cumming
(74) Attorney, Agent, or Firm—Joseph Giordano

(57) ABSTRACT

A communications network may include a translation server containing a NGPN-to-HLR mapping table. The translation server may be a single, centralized translation server; or several TSs may be on the network. When a number of translation servers are used, a VLR or other network entity receiving an NGPN determines which translation server contains the mapping for that NGPN. One way to do this is when a subscriber roams out of his "home" region, his NGPN is presented to the "foreign" service provider's TS. The foreign TS broadcasts a query to all other TSs in the network either simultaneously or in stages. Another way is that a VLR receiving a NGPN performs a hash function on the NGPN. The hash function identifies a translation server. The VLR may then query the translation server and obtain the NGPN-to-HLR mapping. Where a hash function is used, an extendable hash function to accommodate the addition of new TSs without changing the VLR operating systems. Alternatively, where translation servers are identified with hash functions, further additional TSs are accommodated by a two stage TS. A TS split into a number of TSs performs a second hash function to determine the location of the TS having the NGPN-to-HLR mapping requested.

16 Claims, 5 Drawing Sheets

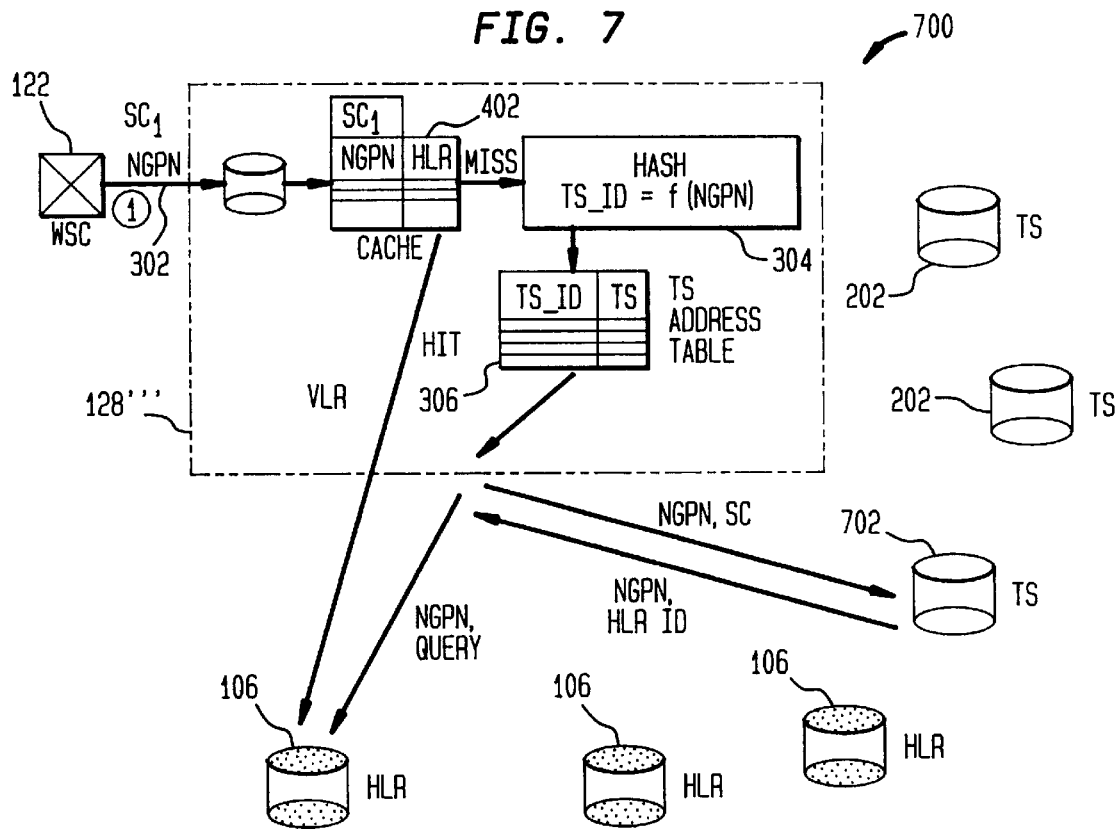
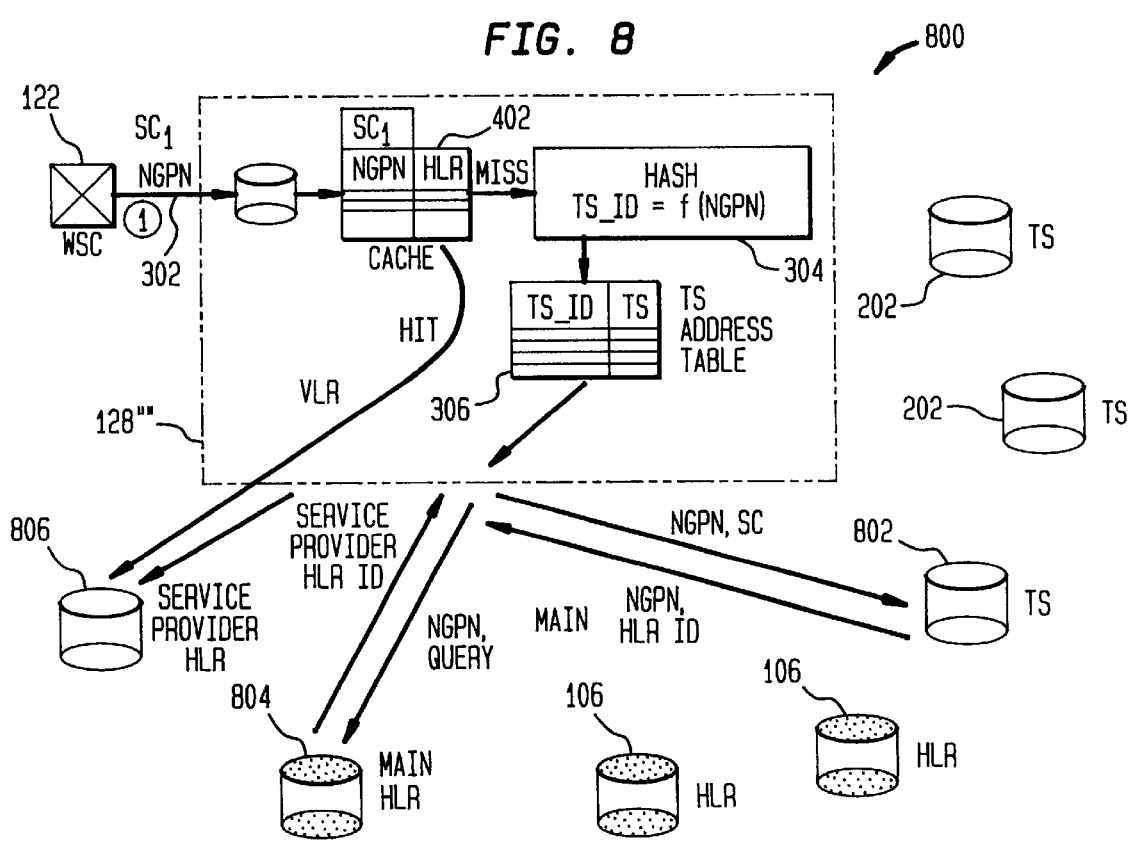

METHOD AND APPARATUS SUPPORTING NON-GEOGRAPHIC TELEPHONE NUMBERS

BACKGROUND OF THE INVENTION

1. Field of the Invention

The present invention relates to wireless communications and, more particularly, to a method and device for identifying the location of subscriber information for a portable communications device (such as a portable telephone) user using a non-geographic number as the only identifying information.

2. Discussion of Background Art

Most wireline telephone numbers are geographic telephone numbers. For example, a fixed communications device, such as a wireline telephone, facsimile (fax) machine, personal computer or the like, has a telephone number with an area code. The area code and the next three numbers of the telephone number (the exchange) contain geographic location information to allow a call directed to the geographic number to be properly channeled through the long distance telephone lines (which may be owned and/or operated by a long distance service provider) to the proper local telephone lines (which may be owned and/or operated by a different, local telephone service provider).

Many wireless communications devices, such as cellular telephones, also have geographic telephone numbers. Because the communications device is portable, it may not always be located in the geographic area indicated by the area code. The exchange may identify a wireless communications service provider. These geographic telephone numbers do, however, provide sufficient information about the wireless subscriber to successfully connect a call.

FIG. 1 is a greatly simplified illustration of a wireless communications network, called a Personal Communications System (PCS) network 100. The PCS is similar to other types of wireless networks and is described to provide background to the following discussion of the invention; it is not intended by any means to limit the invention to use with PCS systems. Indeed, a person skilled in the art will readily appreciate that the invention may be used in many types of communications systems and is particularly suitable for use in wireless communications systems. The PCS 100 includes a signaling network 102, which supports a switched communications network. A switched communications network may be, for example, a public switched telephone network (PSTN) or an Integrated Signaling Digital Network (ISDN). The signaling network 102 is connected to a wireless communications system 104.

An illustrative signaling network 102 includes (among other things) a network database 105, which may be a service control point (SCP). A database called a Home Location Register (HLR) 106 is part of the signaling network. The HLR 106 is connected via link 108 to a Regional Signaling Transfer Point (RSTP) 110. The RSTP 110 is connected via a number of links 112 to several Local Signaling Transfer Points (LSTPs) 114. Each LSTP 114 is connected via a number of local links 116 to a number of switches such as Service Switching Points (SSP) 118. The SSP 118 connects to customer premises to provide for premises equipment, such as a wireline telephone 120. An SSP 118 may also connect to one or more Wireless Switching Centers (WSC), Mobile Switching Centers (MSC), or Radio Port Control Units (RPCU) 122, which are part of the wireless communications system 104. The WSC (or MSC or RPCU) 122 is connected to a number of Base Stations (BS) (or Radio Ports (RP)) 124, which monitor a "cell" (or "coverage area") 126. One or more WSC 122 are connected to a second database called the Visiting Location Register (VLR) 128.

The HLR 106 contains a database maintained by a user's local telecommunications service provider at the user's home location. This database includes information about the user, called the user profile. The VLR 128 is maintained by a telecommunications service provider at the location the portable device user and portable device 130 are visiting. The portable device 130 may be a wireless telephone, a personal digital assistant (PDA) having wireless communication applications, or other device. The VLR 128 stores a subset of the HLR 106 user information, and records that the portable device 130 is currently located in the area serviced by that VLR. The HLR 106 keeps a record of the VLR in which the portable device is currently located. When the portable device 130 travels to an area covered by a different WSC 122, the device is registered in the new WSC 122. The new location is stored in the VLR 128. If the portable device 130 travels to an area covered by another VLR 128, the subset of the HLR 106 data stored in the previous VLR is transferred to the new VLR. The location of the new VLR is stored in the HLR and the previous VLR location is deleted from the HLR 106.

Wireless communications services are provided by wireless communications service providers, which may or may not also be local telephone service providers. Some wireless services, such as proposed PCS service, do not use geographic telephone numbers. Such telephone numbers, called non-geographic (tele)phone numbers or NGPN, do not contain the information identifying the subscriber's signaling network database, which contains, for example, the service provider's HLR containing the subscriber's user profile. They also do not contain the information necessary to identify the service provider serving that subscriber, from which the identity of the signaling network database may be obtained.

Each wireless service provider may have one or more HLRs. Moreover, a service provider may need to add HLRs as it obtains additional subscribers when the current HLR(s) have run out of storage space or the current HLR(s) cannot efficiently process information for all of the subscribers contained in the existing HLRs. Also, a service provider may have HLRs located in a number of geographic locations to reduce communications costs to subscribers having home locations in those geographic regions.

One currently proposed manner in which the appropriate signaling network database is identified from a NGPN is Global Title Translation (GTT). GTT is performed by the local and regional signaling transfer points and translates a subscriber's NGPN to the identity of the appropriate HLR 106 for that subscriber. These signaling transfer points' main function is to handle call setup and calls. Use of the LSTP and RSTP resources to perform the NGPN translation ties up valuable signaling resources.

In addition to the drawback of STP resource usage, GTT may not be practical in future communications systems. This is because future communications systems may use asynchronous transfer mode (ATM) networks as the wireline communications network. GTT may not be used because an ATM network will use the same physical network for transmitting signaling messages used to set up calls and for transmitting the calls themselves. (Currently, signaling messages are sent on a signaling network separate from the voice trunk network.) Because the same network will be used for call set up and the actual data transmission, signaling transfer points will not be used in the network, and therefore GTT will not be available.

NGPN translation may be required in many situations. Three of these situations are:

(1) When a subscriber travels from an area covered by a first VLR into an area covered by a second VLR, the HLR must be updated so that calls may be routed to the proper location. The subscriber's HLR needs to be identified in order to update the user profile.

(2) When a call is directed to the subscriber having a NGPN, the translation is used to locate the HLR so that (a) the portable device may be located, and (b) call delivery options—such as call forwarding or call screening—may be obtained.

3) When a subscriber having a NGPN. originates (places) a call, the translation may be used to identify the subscriber's HLR so that authentication information and service profile information (such as billing information, long distance carrier, etc.) may be obtained.

The NGPN translation process is initiated when an NGPN is presented to a network entity in one of the above situations. The network entity may be a VLR, SSP, STP, or other "intelligent" network entity. For simplicity, the specification generically assumes the NGPN is presented to a VLR. It should be understood that any "intelligent" network entity may be suitable.

A practical NGPN translation method should meet several criteria. First, it should be fast and efficient. Second, the translation should be able to be performed by widely distributed network entities, such as VLRs, SSPs, or SCP serving the caller. Third, the translation method should be scalable to handle an increase in the number of subscribers and signaling databases using NGPNs. Fourth, the translation method should be flexible so that changes in the NGPN-to-HLR mapping (such as a subscriber changing service providers, two service providers merging into a single company, the HLR becomes saturated, a subscriber moves to a different geographic location, etc.) may be made dynamically, without halting the service provider's operation. It may also be desirable for a NGPN translation scheme to permit an independent entity, such as a Numbering Plan Administrator, to chose NGPNs for subscribers without considering how the numbers will map to HLRs (i.e., without regard to service provider, geographic location, etc.).

Therefore, it is an object of the present invention to provide a NGPN translation system that may be used in the absence of signaling transfer points or other entity performing GTT.

It is a further object of the present invention to provide a NGPN translation system that is fast and efficient.

It is yet another object of the present invention to provide a NGPN translation system that may be performed by widely distributed network entities.

It is an even further object of the present invention to provide a NGPN translation system that is scalable.

It is yet even another object of the present invention to provide a NGPN translation system that permits dynamic changes to the mapping.

It is yet even a further object of the present invention to provide a NGPN scheme that allows an independent entity to assign numbers without regard to HLR mapping.

SUMMARY OF THE INVENTION

These and other objects of the present invention are provided by translation servers added to the communications network. A translation server is a network entity that contains a NGPN-to-HLR mapping table.

Translation servers (TS) may be configured in several ways. In a first preferred embodiment, the translation server is a single, centralized translation server. A VLR queries the central TS to obtain the appropriate HLR address. In a second preferred embodiment, a number of translation servers may be distributed in the signaling network.

When a number of translation servers are used, a VLR receiving an NGPN should be able to determine which translation server contains the mapping for that NGPN. This may be done in several ways. In a first preferred embodiment, a subscriber that has roamed out of his "home" region serviced by his service provider, will have his NGPN presented to the TS of a service provider at his current location (a "foreign" service provider). The foreign TS may broadcast a query to all other TSs in the signaling network either simultaneously or in stages. In a second preferred embodiment, a VLR receiving a NGPN performs a hash function on the NGPN. The hash function identifies a translation server. The VLR may then query the translation server and obtain the NGPN-to-HLR mapping.

Where a hash function is used, one preferred embodiment uses an extendable hash function to accommodate the addition of new TSs without changing the VLR operating systems. In another embodiment of the translation servers identified with hash functions, further additional TSs are accommodated by a two stage TS. A VLR forms a first hash function. If a TS has split into a number of TSs, the split TS performs a second hash function to determine the location of the TS having the requested NGPN-to-HLR mapping.

The present invention may also be used where a subscriber uses different service providers for different communications services, such as voice, data, and/or video service. Other applications for the present invention are also possible, such as cell relay address translation, Internet and domain name translations, 800 number translation, and local telephone number mobility.

BRIEF DESCRIPTION OF THE DRAWINGS

The present invention is described with reference to the following figures:

FIG. 7 is a block diagram of a communications system having a VLR which determines the translation server address for a subscriber having more than one communications service, according to one embodiment of the present invention; and FIG. 8 is a block diagram of a communications system having a VLR which determines the translation server address for a subscriber having more than one communications service, according to another embodiment of the present invention.

DETAILED DESCRIPTION OF PREFERRED EMBODIMENTS

This description assumes that the NGPN is presented from a switching center, such as a MSC (or RPCU) 122 or a wireless switching center to a VLR. The VLR obtains the NGPN-to-HLR mapping, either by performing the transiatior; or determining the translation from other entities in the network.

The Translation Server

One embodiment of the present invention is to provide a translation server (TS) configured to perform a NGPN-to-HLR mapping. The TS may be a separate network entity, it may be distributed along the communications network in a number of entities, or it may be located in another network entity, such as a HLR or VLR.

Figure 1:
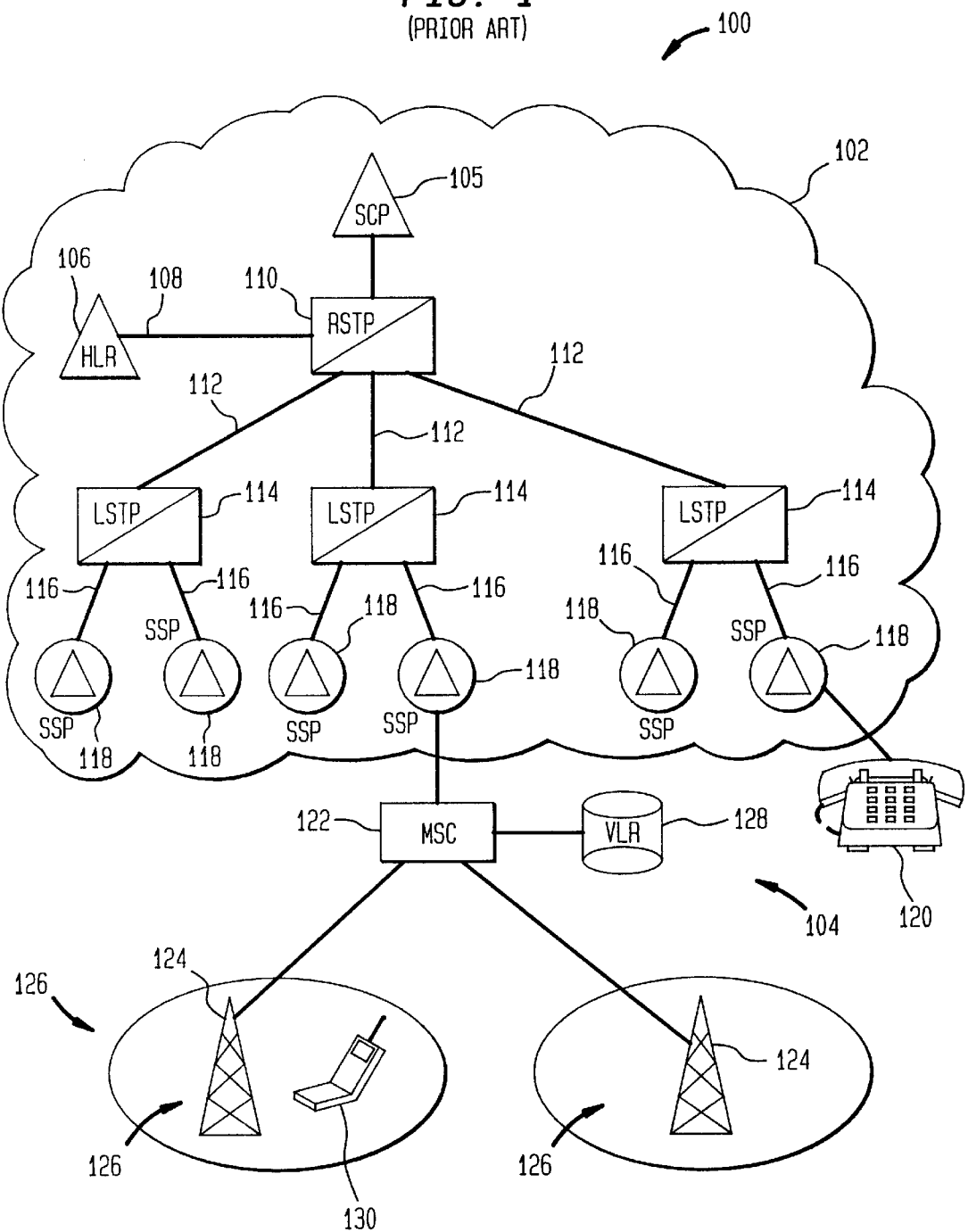
FIG. 1 is a diagram of an illustrative wireless communications system.
Figure 2:
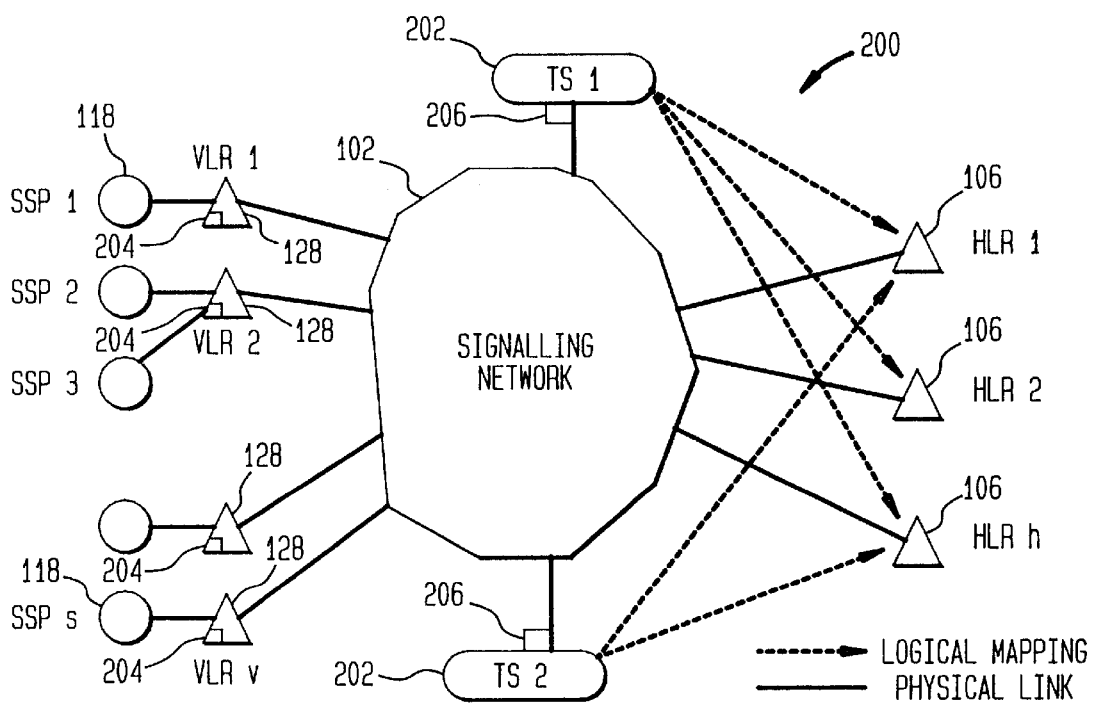
FIG. 2 is a block diagram of a high-level architecture of a communications system having a translation server according to the present invention.

FIG. 2 illustrates a high-level architecture of a communications system 200 having a translation server 202 according to the present invention. FIG. 2 shows the TS as a separate network entity, but it need not be a separate entity. When a NGPN is presented to a VLR 128 by a SSP 118, the VLR has a pointer or performs a hash function (described below) which directs the number to the TS 202. The TS includes a database, such as a look-up table, which receives the NGPN and maps it to the appropriate HLR 106. This mapping may be a standard file or database search and may be performed in any number of ways obvious to a person skilled in the art. If the NGPN-to-HLR mapping has to be changed for any reason (i.e., subscribers are added, deleted, or changed, for example), only the TS—not the VLRs—should be updated. This is much simpler to accomplish. One reason for this is that a large number of VLRs are distributed throughout a communications network; here, only the TS 202 needs to be updated, rather than a large number of network entities (VLRs).

There may be a TS 202 associated with each HLR 106. On the other hand, it may be preferable to provide a single, centralized translation server 202. When a switch receives a NGPN, it forwards it to the VLR 128. The VLR queries the central TS (the call will be held at the switch until it receives further instructions) to obtain the appropriate HLR address. The VLR then queries the HLR to determine how to route call. One possible drawback of the single, centralized TS is that as the number of NGPNs grows, the TS may not be able to handle the processing demands. One way to alleviate this problem is to use a parallel database processing machine as the TS.

Another way to alleviate this problem is to use a cache memory 204 at the VLRs, as seen in FIG. 2. Each VLR may have an associated cache memory 204 which will maintain a number of recently called NGPNs and the associated HLR addresses. When an NGPN is received by a VLR, it will compare the received NGPN with the NGPNs in memory; if the NGPN is stored in the cache memory 204, the HLR address is already available, and the TS need not be queried. If the NGPN is not stored in the cache memory, the VLR queries the TS and obtains the appropriate HLR address. The NGPN and HLR address may be stored in the cache memory and, if necessary (e.g., if the cache is full), another NGPN and identifier (perhaps the least recently used NGPN) is deleted from the cache memory 204. Alternatively (or in addition), the TS 202 may have a cache memory 206.

Where a cache is used, information stored in the cache may become invalid if the NGPN-to-HLR mapping is changed. Several alternatives exist for insuring that the information in the cache is eventually updated. In one alterative, the cache is not immediately updated when the mapping is changed; instead, when the VLR queries the HLR indicated in the cache, the HLR returns a message indicating that the mapping is not found. The VLR then uses the usual non-caching procedure for querying the appropriate TS as before. A person skilled in the art recognizes other alternatives are equally suitable.

Alternatively, a network may have a number of TSs. For example, each service provider may maintain its own TS 202. Each TS maintains the NGPN-to-HLR mapping for the subscribers to that service provider. (If a service provider has only one HLR, a TS may not be required because no NGPN-to-HLR mapping is necessary.) This allows each service provider to store its subscriber information separately from other service providers. The maintenance of the TS information becomes decentralized. When a subscriber changes service providers, the subscriber's NGPN is deleted from one TS and added to another.

With this alternative, a system should be provided for the case where a subscriber roams outside of a service provider's "home" region (the geographical region served by the service provider) into a "foreign" region. When an NGPN is presented to a foreign MSC or RPCU 122, the NGPN may be forwarded to the foreign service provider's TS. The foreign service provider's TS obtains the appropriate HLR address using one of the following methods:

1. The foreign TS broadcasts a query to all other TSs. This may be done in a single, parallel broadcast or in a chain of queries. The "home" TS sends the foreign TS the NGPN-to-HLR mapping.
2. A combination of broadcast and other schemes. For example, broadcasts may be made in stages, with certain TSs queried first. The TS queried by each stage may be determined on a variety of criteria, such as a service provider's total number of subscriber, geographic location with respect to the inquiring TS, etc.

This method is equally applicable to any multiple TS configuration, regardless of who maintains each TS.

Some decrease in processing time may be achieved by caching at either the VLR or the TS. As described above, a cache is a limited memory containing all of the NGPN translation information for a number of recently accessed numbers.

Translation Servers Using Hashing Functions

Figure 3:
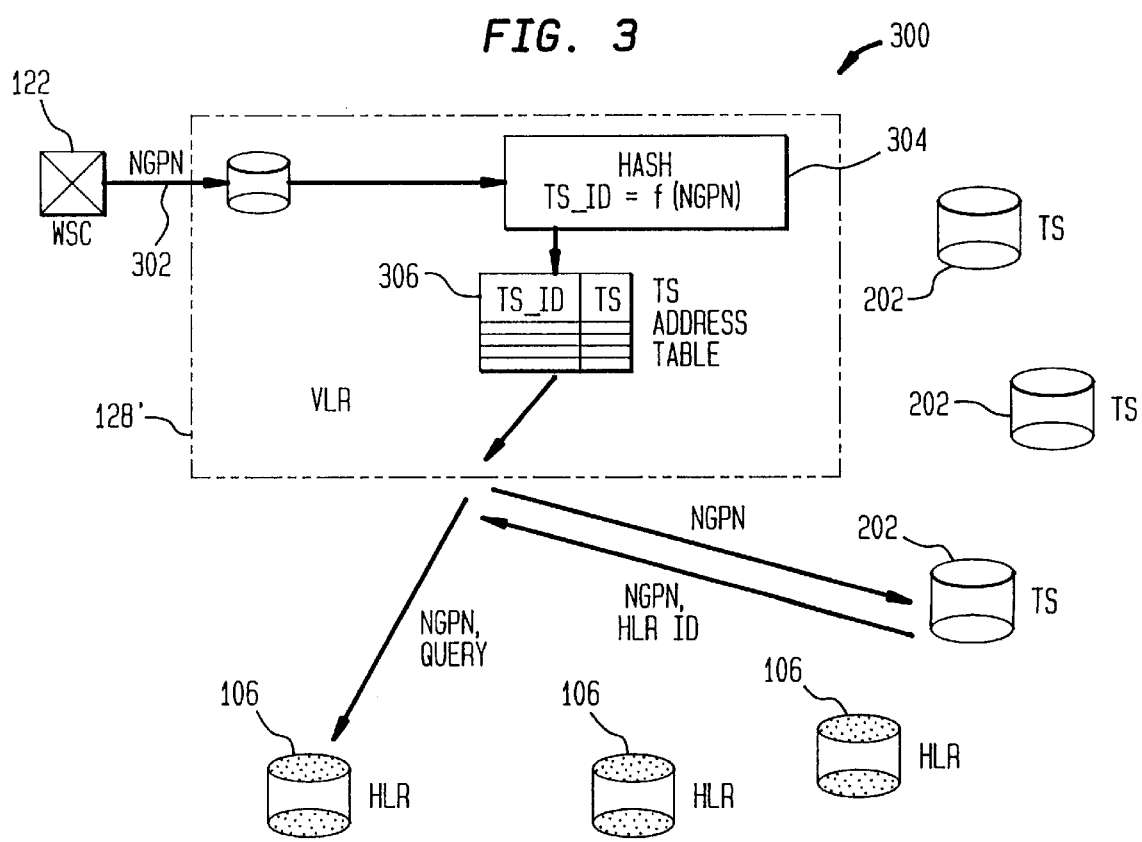
FIG. 3 is a block diagram of a communications system having a VLR which determines the translation server address using hash functions, according to one embodiment of the present invention.

FIG. 3 is a block diagram of a communications system 300 having a network entity, such as a VLR 128', which determines the TS identification using hash functions. The system includes a wireless switching center 122 (or MSC or RPCU), a VLR 128' having a hash function processor 304, a TS address table 306, one or more TSs 202, and a number of HLRs 106.

The HLR address for a NGPN may be found in the following manner. When a NGPN translation is desired (such as call origination, call termination, or VLR handoff), the NGPN is presented to a switch SSP 118, WSC, MSC, or RPCU 122. The switch holds the call and forwards the NGPN to a VLR 128'. The VLR receives the NGPN at an input 302 and forwards it to the hash function processor 304. The VLR performs a hash function (described in more detail below) on the NGPN, preferably to a binary representation of the NGPN, to obtain a value f(NGPN), where f is a hash function.

The hash function result typically is not a network address. If it is not, the function result may be sent to a TS mapping table 306. The TS mapping table contains a table of hash function results and associated TS addresses. The TS mapping table receives the NGPN and obtains the appropriate TS address. Once the TS address is obtained, the VLR 128' queries the identified TS to determine the HLR address for the NGPN. This may be done by forwarding the NGPN to the TS. The TS looks up the identifier of the HLR serving that NGPN and forwards it to the VLR. The VLR contacts the identified HLR and continues the call set up. After the call is set up, the call is connected from the switch.

To implement this architecture, the VLR operations support system will load hash functions, manage the NGPN-to-HLR mapping, and provide other administrative functions (if any) for supporting the translation scheme.

The Hash Function

Hash functions are well known. For the present invention, two desirable traits of a hash function are (1) easy computation; and (2) maps roughly the same number of NGPNs to each TS.

One example of a simple hash function for a system having two TSs is the function even( ). This function returns, for example, a result of 0 if the NGPN ends in a 0 or even number (note that the binary representation of an even number ends in a 0) and a result of 1 if the NGPN ends in an odd number (the binary representation of an odd number ends in a 1). Thus, in this example, NGPNs ending in an even number are stored in a first TS and NGPNs ending in an odd number are stored in a second TS. This hash function satisfies both criteria above, provided that the amount of NGPN telephone numbers ending in even and in odd numbers are relatively equal.

Other hash functions are known. See, for example, D. Knuth, *The Art of Computer Programming, Vol. 3, Sorting and Searching*, Chapter 6, section 6.4, Addison-Wesley 1973. Examples of some hash functions that may be used in the present invention are:

The mod hash function: The hash function f is determined by dividing the NGPN by the number of TSs (t) in the system. The result is the value NGPN mod t. When using a mod function, t is typically selected to be a prime number. This allows the number of TSs to be increased in intervals of prime numbers (1, 3, 5, 11, 13, 17, 19 etc.).

The "middle square" function: The hash function f is determined by the NGPN, a positive integer r, and the number of TSs (t) in the system. The value of t should lie between 1 and $2^r$. Let p be a number representing the middle r bits of the binary representation of the square of the NGPN. The result is the value p mod t. The value of t does not need to be a prime number.

The "folded sum" function: The hash function f is determined by the NGPN and the number of TSs t in the system. The function partitions the representation of the NGPN into several portions and adds these portions to obtain a value p (for example, NGPN 500-555-1234 may become 5+0+0+5+5+5+1+2+3+4=30). The result is the value p mod t. The value of t does not need to be a prime number.

The hash function chosen should be selected according to the number of TSs in the system and the manner in which the NGPNs are selected and assigned. A person skilled in the art readily appreciates that, depending on the implementation, other hash functions may also be suitable.

As discussed above, the hash function result typically is not a network address that may be used directly with the signaling network. One way to convert the hash result into a network address is to load a mapping table 306 into each VLR. For example, in the even( ) hash function described above, the mapping table 306 may have a table that maps hash result 0 to a first TS network address and hash result 1 to a second TS network address. This mapping table will be the same for all VLRs and will need updating only if a new TS (rather than a new subscriber or HLR) is added to the network.

A second way to convert the hash result into a network address is to reserve a block of consecutive network addresses for TSs, ranging from TS_low to TS_high, and generate the network TS address as TS_low+f(NGPN).

Caching NGPN Translations

Figure 4:
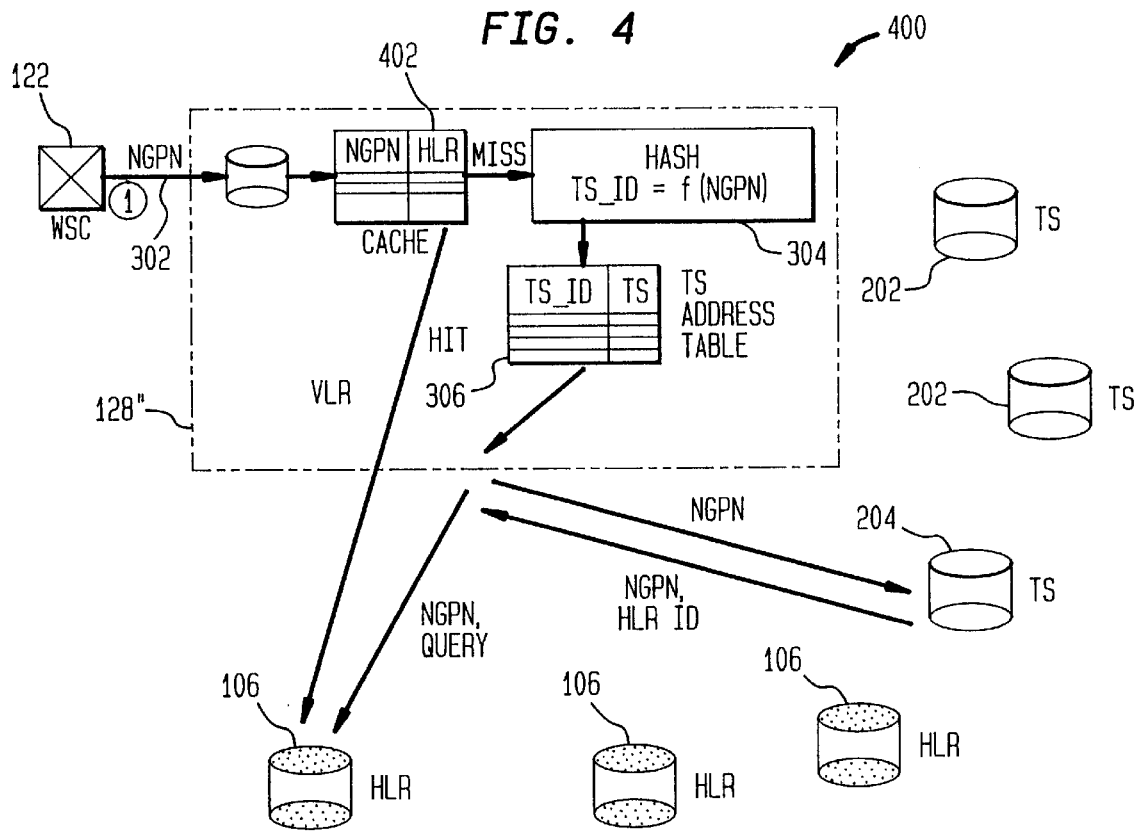
FIG. 4 is a block diagram of a communications system having a VLR which determines the translation server address using hash functions and has a cache memory, according to one embodiment of the present invention.

As seen in FIG. 4, the VLR 128" is the same as VLR 128' of FIG. 3 but also includes a cache memory 402. As described above, caching may reduce the number of times a VLR queries the TS server by storing HLR addresses for recently requested NGPNs. If a VLR 128" is presented with a NGPN for the first time, it performs the hash function, converts the result into a network address, and queries the TS for appropriate HLR address. The NGPN and associated HLR addresses are stored in the cache. If a NGPN is presented to that VLR 128", a search of the cache memory 402 is performed to determine if the HLR mapping for the number is stored in the cache. If it is (a "cache hit"), there is no need to query a TS for that information and the HLR may be queried. If the information is not stored in the cache memory 402 (a "cache miss"), the hash result is sent to the TS mapping table 308, as described above.

A number of cache memory management schemes are known. Because the size of a cache memory is intended to be limited, once the memory is filled, there should be a memory management system to determine which entries remain and which entries are purged from the cache memory. A Least Recently Used scheme may be used, for example, wherein the least recently used NGPN is replaced by a new NGPN. A person skilled in the art recognizes that other cache memory management schemes may be equally suitable for use in the invention.

The size of the cache memory 402 may be selected according to the VLR or TS in which the cache is intended to be used. For example, frequently queried VLRs or TSs may have a larger cache memory than less frequently queried VLRs or TSs.

Translation Server Maintenance Operations

To maintain up-to-date information in a TS, it should be possible to add or delete a subscriber from a TS and to change a subscriber from one HLR to another. As the number of subscribers grows, additional HLRs and TSs may become necessary. In order for the TS servers to maintain up-to-date information, it should also be possible to add an HLR to the system, split the subscribers of one HLR into two (or more) HLRs, and split the subscribers on one TS into two (or more) TSs.

Examples of how each of these operations is performed is described:

Add a Subscriber: When a new subscriber is being added to the system, a service profile is created for the subscriber and stored in an appropriate HLR. The hash function is performed on the NGPN to determine in which TS the HLR address associated with the NGPN is to be located. The proper TS is then updated and receives the NGPN-to-HLR mapping information for that subscriber.

Delete a Subscriber: When a subscriber is being terminated from the system, the hash function is performed on the NGPN to determine in which TS the HLR address associated with the NGPN is stored. The TS is searched to find the subscriber's NGPN and the associated HLR information. The record for the NGPN-to-HLR mapping for that NGPN is deleted from the TS. The subscriber's user profile may then be deleted from the HLR.

Move a Subscriber To a New HLR: When a subscriber is being moved to a new HLR, the hash function is performed on the NGPN. The TS is determined and queried to find the current HLR address. The subscriber information is updated to the new HLR and the TS entry for that NGPN is then updated to reflect the new HLR address.

To Add a New HLR: When a new HLR is being added having substantially all new subscribers, when a new subscriber is added to the new HLR, the same procedure for adding a subscriber to an existing HLR is performed. The new NGPN and HLR address are added to the TS.

Splitting an HLR: An HLR having h records is to have n (where n<h) new subscribers added to it. However, h+n records exceeds the HLR's capacity. Thus, a new HLR is required to accommodate the new subscribers. A new HLR should be installed in a manner that each HLR has roughly the same number of NGPN records. Thus, each HLR should hold about (h+n)/2 records.

After the new HLR is established, the (h−n)/2 records to be moved are copied into the new HLR. The TS entries for existing NGPNs that were moved to the new HLR are updated as described above. After the user profiles are stored in the new HLR, these records are deleted from the old HLR.

Alternatively, the old HLR may copy the (h−n)/2 addresses to the new HLR, perform the hash function of these numbers, and store the results on a table. After all of the numbers are hashed, the table entries are forwarded to the respective TSs to update the HLR information. The numbers moved to the new HLR are deleted from the old HLR.

Splitting a TS: When a new TS is required (for example, if the number of NGPNs is too large for the current TSs to process efficiently), the entries in the current TSs may need to be redistributed into a greater number of TSs. This will require a change in the hash function, because one or more new TS identifiers will exist. Because the hash functions change, each VLR in the system changes its hash function processor 304 to process the new hash function. It is preferable to reduce the VLR modification time to reduce VLR "down time". Also, it is preferable to change the hash function in a manner so that only a variable of the existing hash function is changed, rather than changing the function itself. In this way, the VLRs do not need to be reprogrammed (which is time and cost intensive), but can be updated by changing a value in a data file, which may be simply and quickly performed.

Assume:

(1) each VLR in the system performs a first hash function f which it uses to map a NGPN to a TS; and
(2) the total number of TSs is to be increased from t to t+1, and the contents of one existing TS is to be modified.

One way in which this may be done that meets the two preferred criteria above (limit down time and change data, not function) is to use a dynamic hashing called extendible hashing. Extendible hashing is discussed in R. Fagin, J. Nievergelt, N. Pippenger, and H. R. Strong, "Extendible Hashing—A Fast Access Method For Dynamic Files", ACM Trans. Database Sys., vol. 4, no. 3, pp. 315–44 (September 1979).

In extendible hashing, the hash function returns a value that is a string of bits, but only k of these bits are used in determining the TS address. The k bits are used to look up the TS identifier in the TS mapping table 306 in the VLR 128. For example, if there are two TSs, k may be 1 and one bit (for example, the most significant bit (MSB) or least significant bit (LSB)) may be looked at to determine the TS address. In this example, the LSB is looked at. If the LSB is 0, a first TS is identified; and if the LSB is 1, a second TS is identified.

When the number of TSs is increased from t to t+1, the value of k is increased to k+1. That is, the next bit is also looked at in determining the TS address. Using the example above, the new k value is increased to 2; the two least significant bits are looked at to determine the TS address.

Figure 5A:
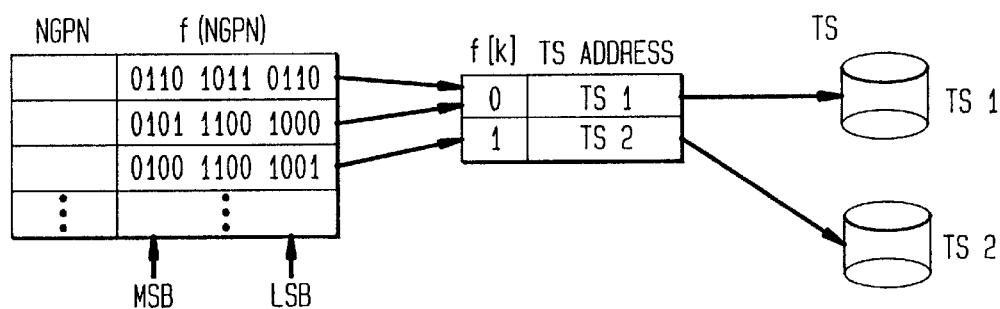
FIGS. 5A and 5B illustrate extendible hashing as used in the present invention.
Figure 5B:
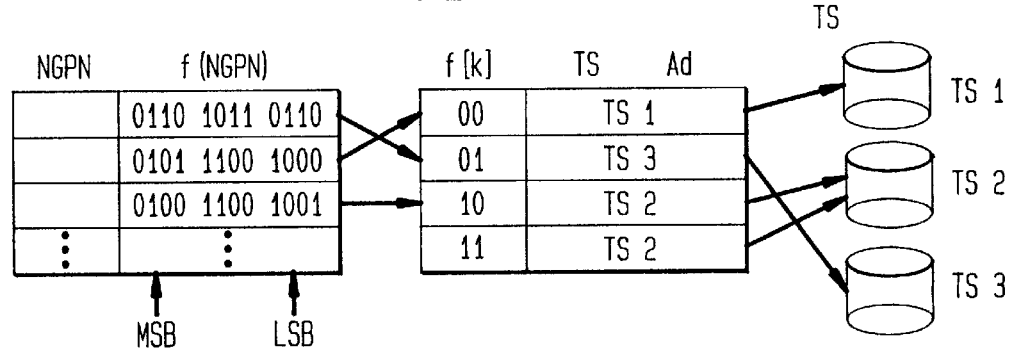

Extendible hashing as used in this invention is illustrated in FIGS. 5A and 5B. As seen in FIG. 5A, if k=1, the TS mapping table has $2^k=2$ rows. The first row contains the network address of TS1 and the second row contains the network address of TS2. The LSB of f(NGPN) is looked at to determine which TS the NGPN-to-HLR mapping may be found. If the LSB is 0, a first TS is identified; and if the LSB is 1, a second TS is identified.

Suppose TS1 is split into TS1 and a new TS3. The value of k increases to 2, so the number of rows in the TS mapping table increases to $2^k=4$ rows, as seen in FIG. 5B. The two LSB of the hash function result are used to determine the TS address. (The LSB is looked at before the second LSB. A hash function "10" is 01 on f [k], because the hash function is read from right to left.) The TS mapping table contains the address for TS1 in the first row, but now includes an address for TS3 in the new second row. In this example, half of the NGPNs previously mapped to TS1 are now mapped to TS3. Rows three and four both contain the address for TS2, so the remaining half of the NGPNs continue to be mapped to TS2.

An example of a preferred procedure for splitting a TS is:
(1) for each NGPN stored in the TS to be split, the hash function is applied and the (k+1)th bit is examined. If the bit is 0, the record remains in the current TS; otherwise, it is copied into the new TS;
(2) increase the value of k in all VLRs and update the TS mapping table to include the new TS identifier; and
(3) all of the records copied into the new TS are deleted from the old TS.

Scalable Translation Servers Using Hashing Functions

Figure 6:
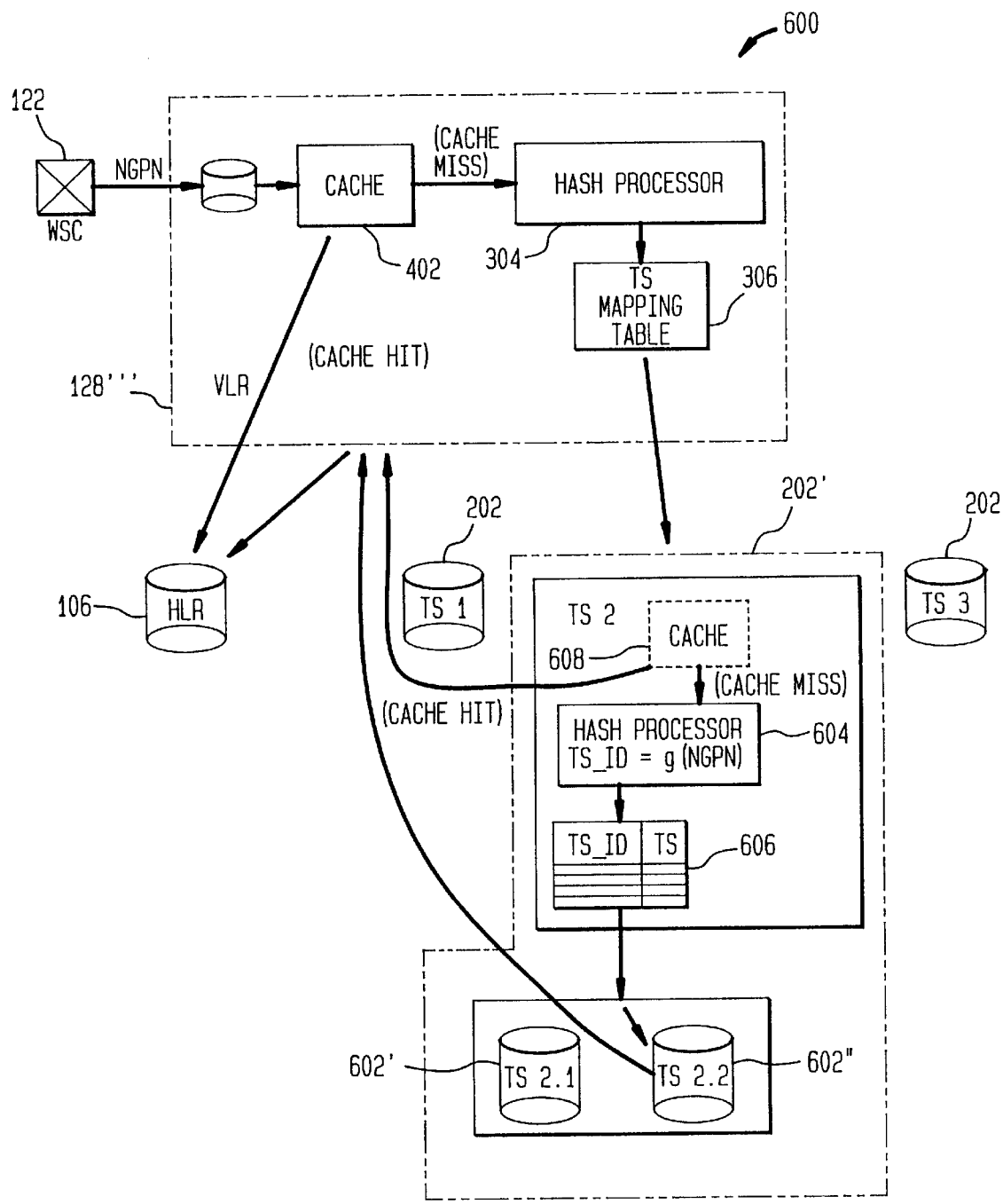
FIG. 6 illustrates an architecture for a communications network having a translation server according to another embodiment of the present invention.

Using the extendible hashing described above where a TS is added to the network, the k value and TS address are changed in each VLR. It may be desirable to have a scalable TS scheme that does not require data in each VLR to be modified when a TS is added to the network. FIG. 6 illustrates an architecture for a communications network 600 having such a scheme. The VLR 128''' is preferably the same as shown in FIG. 3 or FIG. 4. The difference occurs in the TS 202' when it is split.

In this embodiment, when a TS is added or split, instead of changing the hash function k value, another level is added to the existing TS. As seen in FIG. 6, assume that TS2 is approaching its memory capacity and adding a new TS becomes desirable. TS2 is split into TS2.1 (602'') and TS2.2

(602"). These new TSs are not addressable by the VLRs, but through TS2 202'.

A second hash function g is performed by a TS hash processor 604 on all of the NGPNs directed to TS2. The results of this second hash function determine if the NGPN mapping information remains in the original TS (now renamed TS2.1) or moved to the new TS, named TS2.2.

When an NGPN is received by a VLR 128", it processes the hash function f in the usual manner. When the TS address obtained from the TS mapping table 304 is for TS2, the NGPN is sent to TS2, also in the usual manner. When the NGPN is received by TS2, the TS hash processor 604 performs second hash function g. The hash results are presented to a TS internal mapping table 606. The results of the mapping table determine if the NGPN-to-HLR information is stored in TS2.1 or TS2.2. The NGPN is directed to the proper TS, and the information is looked up and returned to the VLR 128'". A cache memory 608 may be used by TS2.1 to avoid querying the TS hash processor 604 and TS internal mapping table 606 for recently requested NGPNs.

If either TS2.1 or TS2.2 is to be split, this method may be repeated to create a third level. Several repetitions of this method may, however, eventually result in a long chain of TSs, requiring the calculation of many hash functions. At some point, the time to obtain the translation causes an unacceptable delay in call set up time. Alternatively, the extendible hashing described above may be used in the second level TSs (e.g., TS2.1 and TS2.2). That is, hash function g is extended by increasing the number of bits looked at by the hashing function. This alternative has the following advantages:

(1) no more than two levels of TS are created and no more than one TS lookup is made;
(2) the extendible hashing is performed only by TSs running out of capacity; other TSs remain unaffected;
(3) the extendible hashing is easier to apply: the changes in k and the TS mapping tables are made in the TS only, not in each VLR; and
(4) different TSs may use different hash functions g, if desired.

The present invention may be used where a subscriber uses a number of communications services. Each service may or may not be provided by a different service provider. In the future, a subscriber may use different service providers for receiving different communication services, such as voice communications, data communications, and video or multi-media communications. Preferably, the translation is performed by adding a service code (SC) to the NGPN and maintaining a mapping table containing addresses for the HLR for each of the subscriber's services.

FIG. 7 is a block diagram of a communication system 700 having a VLR 128'" which determines the translation server address for a subscriber having more than one communication service, according to one embodiment of the present invention. Each service provider may maintain a separate database (such as an HLR) containing a user profile for the subscriber. A call or registration may involve consulting a different HLR depending on the communications service desired.

When a NGPN is presented to a VLR (or other suitable network entity) for call delivery, origination, or registration, it is accompanied by a service code describing the type of service requested. For example, voice may be 0 ("00"), data may be 1 ("01"), and video or multi-media may be 2 ("10"). This service code is non-geographic because it does not identify the service provider, but only identifies the service type. The hash function processor 304 hashes the NGPN as described above and queries the identified TS. The query contains not only the NGPN, but the service code. The TS 702 contains an NGPN-to-HLR mapping to the appropriate HLR according to the requested service. Thus, the TS 702 uses a combination of the NGPN and service code to return the address of the database belonging to the appropriate service provider.

FIG. 8 is a block diagram of a second embodiment of a communication system 800 having a VLR 128"" which determines the translation server address for a subscriber having more than one communication service. As seen in FIG. 8, the TS 802 contains an NGPN-to-HLR mapping for only a single HLR, regardless of the service requested. The TS 802, returns the HLR address to the VLR, and the VLR queries this HLR, called the "main" HLR 804. The query to the main HLR 804 contains the NGPN and SC. The main HLR contains a mapping for the service code to the address of the appropriate HLR 806 or other database for the requested service.

A person skilled in the art recognizes that the TS and cache maintenance operations can be readily modified to accommodate this application.

OTHER APPLICATIONS FOR THE INVENTION

Cell Relay Address Translation

The dynamic hashing scheme described above may be used in the interconnection of ATM and cell relay systems, such as public cellular communications systems. When a person having an ATM enterprise network (such as a local area network (LAN)) places a call to be delivered on a cell relay system, there is a mismatch in the addressing used by the two networks. For example, a typical ATM LAN may have a customized, private address numbering system unique to that LAN; public cell relay systems typically have a uniform address numbering system, such as the E.164 numbering plan.

A translation server as described above may be used to 10 establish an interface between an ATM enterprise network to communicate with a cell relay system. This may allow, for example, e-mail to be sent to and from an enterprise network to a wireless PDA. The translation server translates between LAN addresses and cell relay system addresses, so that communications may be forwarded to the correct locations.

Internet and Domain Name Translations

The dynamic hashing scheme described above may also be used in the interconnection of private enterprise networks using Internet addressing and a network using another addressing system, such as E.164.

There are two types of Internet addresses. The first is the domain name (such as "user@company.com"), the second is the IP address, which is a 12 or 16 digit number associated with an Internet gateway.

Both the current and proposed (IPv6) Internet addressing systems are Internet access provider-based. If a customer changes providers (i.e., changes from America On Line to Prodigy), the user's domain name changes (i.e., from user@aol.com to user@prodigy.com) as well as his IP address. A translation server may be provided to permit a person already having Internet access through a first access provider to a change to a second access provider, without changing his Internet IP address and/or his domain name. Internet communications may be routed through one or more TSs, as described above, and the communications may be sent to the intended recipient regardless of the address provided by the Internet access provider. Thus, it is possible to provide Internet users with universal domain names and/or IP addresses.

Local Telephone Number Portability

Local phone number portability is the ability for a wireline telephone service customer to change geographic locations, yet keep the same phone number the customer had at the previous location. This is particularly beneficial for businesses. A change in geographic location, for example, from New York City to New Jersey, may involve a change in geographic location (changing the telephone number area code and exchange, e.g., from 212-xxx-xxxx to 201-xxx-xxxx), and a change in local telephone service provider (e.g., from NYNEX to New Jersey Bell).

One suggested method for providing local number portability is to route calls to a database, such as a translation server in the communications network. These translation servers may be accessed, identified, and managed using the present invention.

800 Number Portability

The present invention may used for 800 number portability, such as when a subscriber wishes to retain the same 800 number when changing service providers. Currently, every service provider maintains the 800 number translation for all 800 numbers, even those belonging to other service providers. It may be desirable to eliminate this method, particularly if there is an increase in the number of 800 number service providers and 800 numbers. The current method may be replaced with the present invention. The present invention allows 800 number portability in the same manner as it allows local telephone number portability.

Conclusion

Several embodiments of translation servers are described, each having unique advantages.

Translation servers have several advantages over other methods of translating NGPNs. The NGPN-to-HLR mapping information for a NGPN is located in one or more network entities, but preferably not in network signaling or switching components whose resources are better used in setting up and maintaining calls. Moreover, signaling transfer points are not used, so ATM signaling networks may be used with the TSs. This location advantage provides easy modification and efficient storage, and does not require modifications to each VLR when subscribers are added, deleted, or changed. A TS may be located in a single convenient location or distributed throughout the network. A single, centralized translation server is fast. It may, however, become too large to efficiently process the number of received translation requests.

A number of TSs distributed through a network is not as fast as a centralized TS, but each TS may handle only a fraction of the total mapping requests. Using a number of TSs identified with the use of a hash function has several advantages. The time to perform other routine maintenance operations (adding, deleting, or changing a subscriber's record) is also acceptable. Also, the translation may be made with a minimum of signals exchanged between the VLR and the TS. Time consuming or difficult operations, such as splitting a HLR or TS, are performed infrequently.

Identifying the TS using a hash function has a scalability advantage, as described. Using dynamic hashing lends itself to easy scalability. The two-level NGPN translation scheme has the advantage of scalability without changes in the VLRs.

The present invention satisfies all of the objects of the invention. It may be used in signaling networks without signaling transfer points. It is fast and efficient. The translation may be performed by widely distributed VLRs and TSs. It is scalable and permits dynamic changes. Because the numbers do not need to contain information about the subscriber's geographic location or service provider, the invention permits portable device numbers to be assigned by an independent entity.

A person skilled in the art understands that the invention may be used with communication systems other than a PCS having an ATM backbone. For example, although a PCS system was disclosed, it is understood that PACS, cellular, or other wireless communication system may also be used. The above described embodiments of the invention are intended to be illustrative only. Numerous alternative embodiments may be devised by those skilled in the art without departing from the spirit and scope of the following claims.

We claim:

1. A method for mapping non-geographic portable device numbers (NGPN) to a signaling network device address, said method comprising the steps of:

generating a table containing NGPNs and associated signaling network device addresses;

presenting a NGPN to the table, said step of presenting comprising broadcasting the NGPN to a number of tables in the signaling network; and obtaining the signaling network device address for the presented NGPN.

2. The method of claim 1, wherein the step of broadcasting comprises simultaneously broadcasting the NGPN to the number of tables in the signaling network.

3. The method of claim 1, wherein the step of broadcasting comprises broadcasting the NGPN in a number of stages, each stage broadcasting the NGPN to fewer than all of the number of tables in the signaling network.

4. A method for establishing communications in a signaling network to subscribers with non-geographic portable device numbers (NGPN), said method comprising the steps of:

generating tables containing NGPNs with associated signaling network device addresses;

presenting a NGPN to a table, the step of presenting comprising performing a hash function on the NGPN;

using a result of the hash function, obtaining a signaling network address from the table; and establishing the connection to the signaling network device address for the presented NGPN.

5. The method of claim 4, wherein the step of obtaining the signaling network address for the table further comprises using the hash function result to look up the table address on a mapping table.

6. The method of claim 4, further comprising the step of selecting the hash function to be an extendible hash function.

7. The method of claim 4, further comprising the steps of:

a. before presenting the NGPN to a table, checking a cache memory for the signaling network device address for the presented NGPN;

b. if the signaling network device address for the presented NGPN is not in the cache memory, presenting the NGPN to a table.

8. The method of claim 4, wherein the step of obtaining the signaling network device address for the presented NGPN further comprises the steps of:

a. checking a cache memory for the signaling network device address for the presented NGPN;

b. if the signaling network device address for the presented NGPN is not in the cache memory, obtaining the NGPN from a table.

9. A method for mapping non-geographic portable device numbers (NGPN) to a signaling network device address, wherein a service code is added to the NGPN, said method comprising the steps of:

generating a table containing NGPNs and associated signaling network device addresses;

presenting a NGPN to the table; and obtaining the signaling network device address for the presented NGPN, the step of obtaining comprising obtaining from the table a signaling network device address for a main network device and obtaining from the main network device a signaling network device address for the presented NGPN and service code.

10. A system for establishing communications in a signaling network to users with non-geographic portable device numbers, said system comprising a plurality of data bases containing user profiles including information identifying the location of the non-geographic portable devices, each non-geographic portable device number being present in only one of said data bases;

a hash processor for receiving all of said non-geographic device numbers and for producing hash processor results;

a translation server containing translation tables and responsive to said hash processor results for identifying the particular one of said data bases containing mapping information for each non-geographic portable device number; and means responsive to the output of said translation server for completing a connection to the particular database for that particular non-geographic portable device number.

11. A translation server (TS) for mapping a non-geographic number to a signaling network entity, comprising:

an input configured to receive the non-geographic number;

at least two tables containing non-geographic numbers and corresponding signaling network entity addresses;

a TS server hash processor connected to the input; and a TS internal mapping table connected to an output of the hash processor and containing a mapping of hash processor results with an address of one of at least two tables.

12. The translation server of claim 11, further comprising a cache memory connected between the input and the tables.

13. The TS of claim 11, wherein the hash processor is configured to process an extendible hash function.

14. A method for establishing communications in a signaling network to a subscriber with a non-geographic portable device number, said network having an original translation server containing records of such numbers, comprising the steps of:

splitting said original translation server into a new translation server and the original translation server, said splitting step comprising applying a dynamic hash function on each non-geographic number contained in the original translation server, using the result of the dynamic hash function, determining which number records will remain in the original translation server and which number records will be moved to the new translation server, copying into the new translation server the number records to be moved thereto, and deleting from the original translation server the copied number records;

presenting a non-geographic portable number to which the communication connection is to be made to the translation servers, said presenting step comprising performing a second hash function on the presented non-geographic portable number;

using a result of the second hash function, obtaining a signaling address from one of the translation servers; and establishing the connection to the signaling network device address for the presented non-geographic portable number.

15. The method of claim 14, wherein the dynamic hash function is an extendible hash function which looks at k bits of the hash function result, further comprising the steps of:

a. the step of determining further comprising examining the (k+1)th bit in determining which number records will be moved;

b. increasing the value of k in the network devices obtaining an address for existing TSs using a dynamic hashing function; and c. updating the network devices obtaining an address for existing TSs to include the new TS.

16. The system in accordance with claim 10 further comprising a cache memory for receiving all of said non-geographic device numbers, said cache memory storing recently called non-geographic device numbers and identification of particular ones of said data bases.

* * * * *

UNITED STATES PATENT AND TRADEMARK OFFICE
CERTIFICATE OF CORRECTION

PATENT NO. : 6,463,270 B1
APPLICATION NO. : 08/592212
DATED : October 8, 2002
INVENTOR(S) : Li-Fung Chan et al.

It is certified that error appears in the above-identified patent and that said Letters Patent is hereby corrected as shown below:

Title Page
Please update the References Cited (56) section on the title page of the issued patent to include the following two references:

5,377,340   A    12/1994   Seroussi et al..........................395/400
5,742,905   A    04/1998   Pepe et al.............................455/461

Signed and Sealed this

Twenty-fifth Day of May, 2010

David J. Kappos
*Director of the United States Patent and Trademark Office*